United States Patent [19]

Snitzer et al.

[11] Patent Number: 5,251,062

[45] Date of Patent: Oct. 5, 1993

[54] TELLURITE GLASS AND FIBER AMPLIFIER

[75] Inventors: Elias Snitzer, Piscataway; Eva M. Vogel, Berkeley Heights; Jau-Sheng Wang, Piscataway, all of N.J.

[73] Assignee: Bell Communications Research, Inc., Livingston, N.J.

[21] Appl. No.: 961,557

[22] Filed: Oct. 15, 1992

[51] Int. Cl.$^5$ .......................... H01S 3/00; H01S 3/16
[52] U.S. Cl. .................................. 359/341; 359/343; 372/6; 372/40; 242/301.4
[58] Field of Search ...................... 372/6, 40; 359/341, 359/343; 385/1, 142, 144; 252/301.4, 301.6; 427/165

[56] References Cited

U.S. PATENT DOCUMENTS

| | | | |
|---|---|---|---|
| 3,462,707 | 8/1969 | Pearson et al. | 372/6 |
| 3,836,868 | 9/1974 | Cooley | 331/94.5 |
| 3,836,869 | 9/1974 | Cooley | 331/94.5 |
| 3,836,870 | 9/1974 | Cooley | 331/94.5 |
| 3,836,871 | 9/1974 | Cooley | 331/94.5 |
| 3,883,357 | 5/1975 | Cooley | 106/47 |
| 4,015,217 | 3/1977 | Snitzer | 359/341 |
| 4,265,517 | 5/1981 | Blair et al. | 252/301.4 R |
| 4,712,075 | 12/1987 | Snitzer | 359/341 |
| 5,093,288 | 3/1992 | Aitken et al. | 501/42 |

FOREIGN PATENT DOCUMENTS 206138 1/1984 German Democratic Rep. .

OTHER PUBLICATIONS

Ryba-Romanowski, W; Acta. Phys. Pol. A (Poland), vol. A78, #5, pp. 761-768, Nov. 1990; abst. only supplied herewith.
Yahkhind et al.; Soc. J. Glass. Phys. & Chem., vol. 6, #4, pp. 323-329, Aug. 1980; abst. only supplied.
Inoue et al.; Nat. Inst. for Res. Inorg. Mater.; Physics of Non-Crystalline Solids, 761, pp. 281-285, 1992; abst only.
Kanoun et al.; P. Sys. Status Solids, vol. 162, #2, pp. 523-529, Dec. 1, 1990; abst only supplied.
M. J. Weber et al., "Optical properties of $Nd^{3+}$ in tellurite and phosphotellurite glasses," *Journal of Applied Physics*, 1981, vol. 52, pp. 2944-2949.
H. Nasu et al., "Third harmonic generation from $Li_2O$-$TiO_2$-$TeO_2$ glasses," *Journal of Non-Crystalline Solids*, 1990, vol. 124, pp. 275-277.
S. Tanabe et al., "Upconversion fluorescences of $TeO_2$- and $Ga_2O_3$-based oxide glasses containing $Er^{3+}$, *Journal of Non-Crystalline Solids*," 1990, vol. 122, pp. 79-82.
J.-S. Wang et al., "Erbium doped tellurite glasses," *Materials Research Society Symposium Proceedings: Optical Waveguide Materials*, 1992, vol. 244, pp. 209-214.
Y. Ohishi et al., "$Pr^{3+}$-doped fluoride fiber amplifier operating at 1.31 μm," *Post-deadline Paper PD2*, Optical Fiber Conference, 1991, San Diego, Calif.
J. L. Jackel et al., "Ion-exchanged optical waveguides for all-optical switching," *Applied Optics*, 1990, vol. 29, pp. 3126-3139.

*Primary Examiner*—Nelson Moskowitz
*Attorney, Agent, or Firm*—Leonard Charles Suchyta; Lionel N. White

[57] ABSTRACT

A tellurite glass particularly usable for an amplifier or oscillator utilizing an optical fiber or other guided wave structure. In approximate terms, the glass contain between 58 and 84 molar % of $TeO_2$, up to 24 molar % $Na_2O$, and between 10 and 30 molar % of ZnO. Other alkali and divalent metals may be substituted for the Na and Zn respectively. Combinations of these tellurite glasses can be formed as an optical fiber (10) having a core (12) with a higher refractive index than that of the cladding (14). The tellurite glass of the core, when composed of at least 0.05 molar % $Na_2O$, can be doped with large amounts of Er, Pr, or Nd to act as a fiber amplifier at 1.5 or 1.3 μm when pumped with light of a specified shorter wavelength. The core can be doped with other rare-earth metals which would provide optical amplifiers or oscillators at wavelengths appropriate to their lasing characteristics.

19 Claims, 5 Drawing Sheets

TELLURITE GLASS AND FIBER AMPLIFIER

SPECIFICATION

1. Field of the Invention

The invention relates generally to glass compositions; in particular, it relates to such glass compositions usable in doped optical fiber amplifiers and laser oscillators.

2. Background Art

An increasing portion of the telecommunications network is employing silica optical fibers to convey an electrically modulated optical signal from a transmitter to one or more receivers. Although silica fibers have been improved to have very low loss, the residual loss is sufficient to require some sort of amplification or regeneration on long legs, which now extend across oceans. Furthermore, in a tree architecture, the signal from a single transmitter is split and distributed to a large number of receivers. Irrespective of fiber loss, the power splitting necessitates amplification or regeneration in order to maintain reasonable signal-to-noise ratios.

Regeneration involves the electrical detection of the optical intensity and the modulation of an output laser by the resultant electrical signal. Such equipment is expensive, difficult to maintain, and demands a highly controlled environment. The problems are worsened when the network utilizes wavelength-division multiplexing (WDM) in which the fiber conveys multiple optical carriers, each modulated with a different data signal.

Optical amplifiers, on the other hand, directly amplify one or more optical carriers with no need to convert the optical signal to an electrical one, but, until recently, they have not been satisfactory. However, erbium-doped silica optical fiber amplifiers (EDFA's) have been recently developed and successfully used in telecommunications. In these amplifiers, the core of a fairly conventional silica fiber is doped with $Er^{3+}$ ions. When the doped fiber is optically pumped at, for example, 1.46 or 0.98 µm from a local semiconductor laser, this fiber amplifies any optical signal in an optical band approximately 40 nm wide located near 1.54 µm. Nonetheless, erbium-doped fiber amplifiers are not totally satisfactory. Although the 1.5 µm band is desirable for its minimum loss in silica, the 1.3 µm band is desirable for its zero-dispersion crossing, an important quality for very high data rates. Erbium-doped silica fiber cannot amplify in this band. Also, silica fiber can incorporate only a modest amount of erbium so that high gain requires long lengths of the doped silica fiber.

Very recent work has developed praseodymium-doped fluoride fibers which amplify in the 1.3 µm band. See, for example, "$Pr^{3+}$-doped fluoride fiber amplifier operating at 1.31 µm," Post-deadline Paper PD2, Optical Fiber Conference, San Diego, Calif., 1991 by Ohishi et al. However, fluoride glass is hygroscopic so that it must be carefully protected from water and humid air, and generally it is a difficult to fabricate free of crystallization. Also, coupling a fluoride fiber amplifier to a silica transmission fiber presents a problem.

Doped tellurite glasses, that is, those containing a major fraction of $TeO_2$ and a small fraction of an excitable metal ion, have been investigated for use as lasing media for bulk lasers, as has been disclosed by Weber et al. in "Optical properties of $Nd^{3+}$ in tellurite and phosphotellurite glasses," *Journal of Applied Physics*, vol. 52, 1981, pp. 2944–2949 and by Cooley in several patents, the most relevant of which is U.S. Pat. No. 3,836,871, discussing a $TeO_2:Li_2O:ZnO$ glass doped with Nd. He further discloses Nd-doped laser glasses of $TeO_2$ and ZnO in U.S. Pat. Nos. 3,836,868 and 3,883,357, of $TeO_2$ and BaO in U.S. Pat. No. 3,836,870, and of $TeO_2$, BaO, and ZnO in U.S. Pat. No. 3,836,869. However, these lasers require only a glass rod which can be cast as such. In contrast, fiber amplifiers require fibers comprising a light guiding core and cladding. The glassy structure needs to be drawn to diameters of considerably less than a millimeter with the core having a diameter of the order of a few micrometers. For the practical drawing of high-quality fiber, the crystallization temperature of the glass must be substantially above the glass softening temperature. Furthermore, for optical confinement the fiber cladding must have an index of refraction less than that of the core. For large values of numerical aperture, often desirable in fiber amplifiers, different material composition should be used. Cooley did not discuss any compatible material combinations. Other tellurite glasses are discussed by Nasu et al. in "Third harmonic generation from $Li_2O\text{-}TiO_2\text{-}TeO_2$ glasses," *Journal of Non-Crystalline Solids*, vol. 124, 1990, pp. 275–277. A glass containing $70TeO_2 \cdot 30Na_2O \cdot 1Er_2O_3$ has been disclosed by Tanabe et al. in "Upconversion fluorescences of $TeO_2$- and $Ga_2O_3$-based oxide glasses containing $Er^{3+}$, *Journal of Non-Crystalline Solids*, vol. 122, 1990, pp. 79–82.

SUMMARY OF THE INVENTION

The invention can be summarized as a tellurite glass composition having low percentages of monovalent alkali metal oxides and divalent metal oxides and optionally containing rare-earth metals as optically excitable dopants. This glass, with suitable compositional changes and dopants to produce the required differences in refractive indices, can be drawn as a glassy optical fiber.

DETAILED DESCRIPTION OF THE PREFERRED EMBODIMENT

Figure 1:
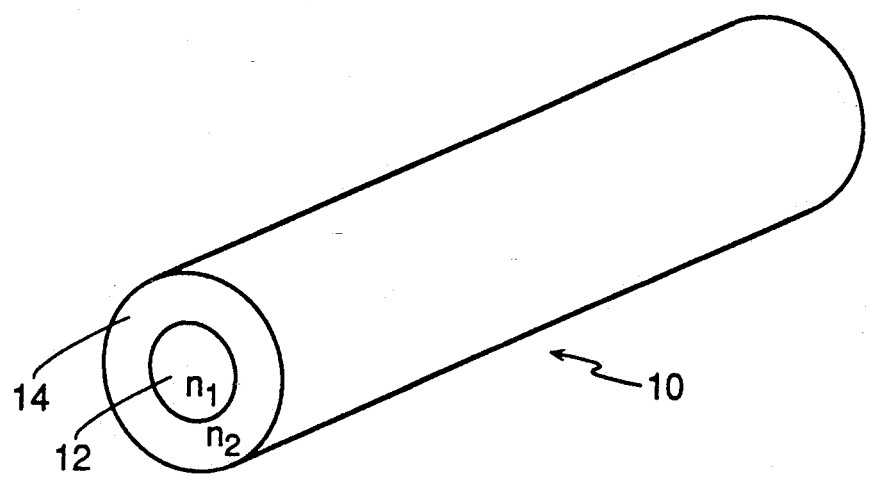
FIG. 1 is a view partially in cross-section and partially in perspective of a simple optical fiber.

We have found that certain compositions of tellurite glasses provide glasses that have superior properties for optical fibers, particularly optical fibers having a core doped with a rare-earth ion for use as an optical amplifier. A simple optical fiber 10, illustrated in FIG. 1, includes a cylindrical core 12 having a refractive index $n_1$ and a tubular cladding 14 surrounding the core 12 and having a refractive index $n_2$ less than $n_1$. This difference in refractive indices causes light propagating along the core 12 to be totally internally reflected at the interface with the cladding 14. The diameter of the core 12 must not be significantly smaller than the wavelength of light it waveguides. On the other hand, for transmission applications, the core diameter should preferably not be significantly greater than this wavelength so that the fiber 10 supports only the single lowest-order optical mode, that is, is a single-mode fiber. Thereby, velocity dispersion between multiple modes is avoided. The fiber 10 of FIG. 1 is included only for discussion purposes. A real fiber may have a considerably more complex structure, for instance, a core with a graded index, an off-center core, a multi-step core-cladding interface, or a double cladding, but its parts would be identifiable with those of FIG. 1.

Several fabrication processes have been developed for manufacturing optical fiber. The most commercially important is the inside CVD process in which the inside of a glass tube is first subjected to chemical vapor deposition (CVD) of the cladding layer and then to CVD of the core layer. Both layers are considerably thicker than the final core and cladding, and a central axial void is left in the tube. Also, both layers are deposited as particulate soot which is then sintered into glass. This structure is called a preform. A two-step process converts the preform to a glassy optical fiber. First, the preform is collapsed so as to eliminate the void. Then, the collapsed preform is drawn to a significantly smaller diameter and longer length, equal to the values for a fiber. CVD is a process that is difficult to perfect for new materials because of the lack of readily available volatile constituents of the required constituents. Therefore, exploratory work commonly relies instead on a melt-and-quench process in which a glass rod is first formed having the core composition. Then one of a variety of methods is used to surround the rod with a glassy layer having the cladding composition. The glass for the cladding can be formed into a tube, and the rod is inserted into the central aperture of the tube. The assembly is drawn down to a fiber by heating and pulling. The process is referred to as the rod-and-tube method. In both cases, the preform must be drawn to form a glassy fiber. Alternatively, the core glass can be placed in the inner well of a double-wall crucible and the cladding glass in the outer well. The crucible is heated in a furnace and both glasses are simultaneously drawn from the crucible into a single fiber.

Accordingly, the materials for the core and cladding must form as glasses and be drawn as glasses. Not all materials form glasses. Those that do, called glass forming materials, exhibit glass softening at a glass transition temperature $T_g$. Below this temperature, the material is a solid glass. Somewhat above this temperature, the material is a viscous liquid which would revert to a solid glass if brought below $T_g$. However, if the temperature of the liquid is raised above the crystallization temperature $T_x$, whether it would revert to a glass or to a crystalline structure at a low temperature depends on the cooling rate. In view of non-uniform cooling rates, it is important that high quality glasses not be heated to close to the crystallization temperature. Preform collapsing and drawing depend on the viscous nature of the materials above $T_g$. For reasonable fiber production, the difference $T_x - T_g$ must be as large as possible.

We have investigated a range of compositions of the tellurite glasses $TeO_2$:$Na_2O$:$ZnO$. The glasses were prepared as follows. High-purity commercial oxides of $TeO_2$, $ZnO$, and $Er_2O_3$ and carbonates of the alkali metal or alkali halides (99.999% and 99.99% pure obtained from CERAC and the Aldrich Companies) were used as the starting materials. Powders of these materials, weighed to conform to the oxide molar percentages presented below (except $Er_2O_3$ and other rare-earth metal oxides, which were measured in wt %), were mixed in a PVC bottle and then transferred to a gold crucible. The crucible was heated to 800° C. in a resistance furnace, at which point the powders had melted, and held in an air ambient for 2 hours. Melts were cast into brass molds preheated to 310° C. The molds had a 1 cm diameter and were 12 cm long so as to form a cylindrical homogeneous preform. The casts were annealed by cooling within the molds as the temperature was slowly reduced to room temperature at 1° C./min.

One part of the preform was subjected to differential scanning calorimetry (DSC) to determine the glass transition temperature $T_g$ and the crystallization temperature $T_x$. Another part of the preform was drawn, if possible, into a homogeneous fiber following a procedure developed for drawing fluoride fibers. The first drawing was performed in a dry nitrogen atmosphere with less than 5 ppm of oxygen and of moisture. However, it is felt that drawing in dry oxygen would be preferable. The drawing temperature was 413°±3° C., and the drawing speed was 2.3 m/min. The resultant fiber diameter was 125 μm with a polymer cladding coating bringing the total diameter to 300 μm. For the applications envisioned here, a loss of less than 5 dB/m in the vicinity of the wavelength of stimulated emission is considered to indicate a useful optical fiber.

Figure 2:
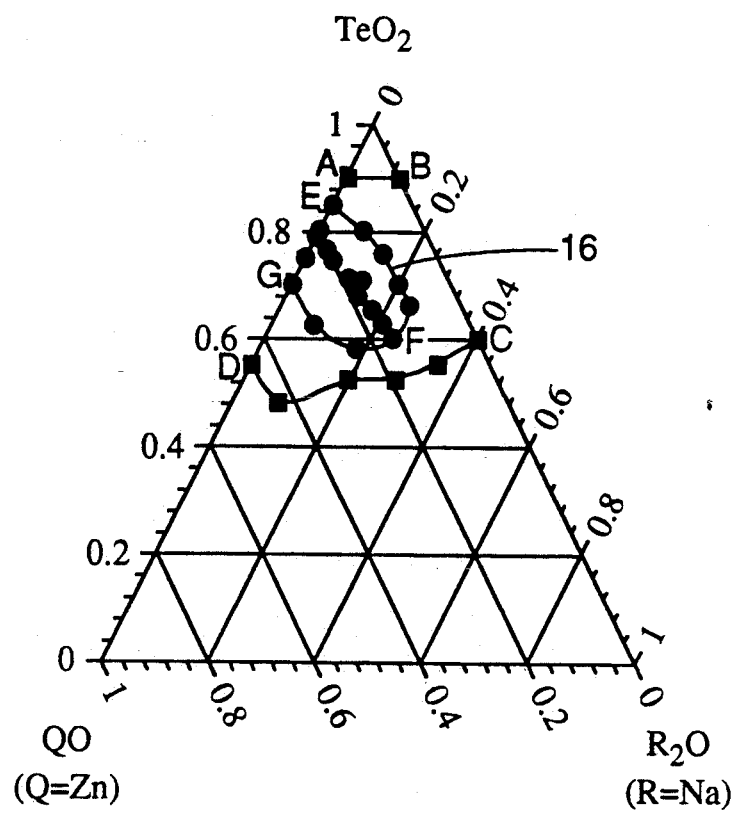
FIG. 2 is a ternary phase diagram illustrating the composition of the glass of an embodiment of the invention.

The ternary phase diagram of FIG. 2 is marked in molar percentages for the constituents $TeO_2$, $Na_2O$, and $ZnO$. Those glasses having compositions marked by squares and included in TABLE 1 were determined to form glasses, as indicated visually and by a distinctive $T_g$ step in the DSC. Thus, all compositions contained within the line ABCD form glasses. However, attempts to draw the glasses of TABLE 1 into fibers were difficult. It is believed that the drawing caused them to crystallize.

TABLE 1

| | Glass Composition | |
|---|---|---|
| $NaO_2$ | ZnO (molar percentage) | $TeO_2$ |
| 8.7 | 43.5 | 47.8 |
| 19.2 | 28.8 | 52 |
| 28.6 | 19.1 | 52.3 |
| 35 | 10 | 55 |
| 0 | 10 | 90 |
| 10 | 0 | 90 |
| 40 | 0 | 60 |
| 0 | 45 | 55 |

Those glasses having compositions marked by circles and listed in TABLE 2 not only formed glasses, they could be drawn into fibers. These glasses were distinguished visually as not containing any crystallites, and their DSC traces showed a wide flat region between $T_g$ and $T_x$. The presence of crystallites produced additional peaks in the DSC traces. The line 16 between points E, F, and G and returning to E defines the observed compositional limits of tellurite glasses that can be drawn easily from a preform to a fiber.

TABLE 2

| NaO$_2$ | Fiber Composition ZnO | TeO$_2$ |
|---|---|---|
| | (molar percentage) | |
| 0 | 20 | 80 |
| 12.5 | 16.7 | 70.8 |
| 20.8 | 16.7 | 62.5 |
| 0 | 25 | 75 |
| 0 | 21.1 | 78.9 |
| 2.6 | 20.5 | 76.9 |
| 5 | 20 | 75 |
| 9.5 | 19 | 71.5 |
| 13.6 | 18.2 | 68.2 |
| 17.4 | 17.4 | 65.2 |
| 24 | 16 | 60 |
| 0 | 15 | 85 |
| 0 | 30 | 70 |
| 8 | 12 | 80 |
| 14 | 10 | 76 |
| 20 | 10 | 70 |
| 8 | 30 | 62 |
| 18 | 24 | 58 |
| 24 | 10 | 66 |
| 4.2 | 16.7 | 79.1 |

In the experimental parts of the program, all annealing and drawing were done in an air ambient. However, it would be preferred to perform all high-temperature operations in a halogenating ambient, such as O$_2$ and CCl$_4$, to attain low loss by eliminating the OH$^-$ absorption.

Although all the above examples employ Na$_2$O as the alkali metal, tellurite glasses of other alkalis and otherwise monovalent metals exhibit similar glass forming properties and beneficial optical properties. TABLE 3 shows values of the refractive index, UV edge (as defined by an absorption coefficient of $\alpha = 5$ cm$^{-1}$), and the bandgap for exemplary glasses incorporating the relevant alkali metals and silver and having compositions with the listed molar percentages. Even though gold and copper are monovalent metals, they are not included because of their unacceptable high optical absorption.

TABLE 3

| Glass Composition | Refractive Index | UV Edge (nm) | Band Gap (eV) |
|---|---|---|---|
| 5Li$_2$O:20ZnO:75TeO$_2$ | 2.053 | 375 | 3.12 |
| 5Na$_2$O:20ZnO:75TeO$_2$ | 2.042 | 370 | 3.23 |
| 5K$_2$O:20ZnO:75TeO$_2$ | 2.030 | 365 | 3.26 |
| 5Rb$_2$O:20ZnO:75TeO$_2$ | 2.015 | 371 | 3.22 |
| 5Cs$_2$O:20ZnO:75TeO$_2$ | 2.003 | 375 | 3.10 |
| 5Ag$_2$O:20ZnO:75TeO$_2$ | 2.095 | | |

Table 3 shows that combinations of the tellurite glasses can be beneficially used to construct an optical fiber having a core with a higher refractive index than the cladding. Also, the wide choice of refractive indices, which can be controlled by using fractions of different alkali metals, allows the fabrication of more complicated fibers, such as one with a double cladding, the outer one having a lower refractive index than the inner one. The divalent metal oxide ZnO can be substituted by BeO, MgO, CaO, SrO, and BaO, all of which exhibit similar chemical behavior. The divalent metals Cd and Hg are not included because they form less stable glasses than does Zn. A series of binary tellurite glasses were prepared having the molar compositions listed in TABLE 4, which also lists their observed glass transition temperatures T$_g$ and crystallization temperatures T$_x$.

TABLE 4

| Binary Glass Composition | T$_g$ (°C.) | T$_x$ (°C.) |
|---|---|---|
| 14Li$_2$O:86TeO$_2$ | 275 | 350 |
| 14Na$_2$O:86TeO$_2$ | 273 | 400 |
| 14K$_2$O:86TeO$_2$ | 269 | 401 |
| 14Rb$_2$O:86TeO$_2$ | 264 | 430 |
| 14Cs$_2$O:86TeO$_2$ | 267 | 389 |
| 12.5MgO:87.5TeO$_2$ | 340 | 441 |
| 11SrO:89TeO$_2$ | 330 | 370 |
| 11BaO:89TeO$_2$ | 325 | 468 |
| 28ZnO:72TeO$_2$ | 324 | 420 |

Thus all these binary compositions are seen to form glasses although the Li and Sr ones are not preferable because of their relatively small values of T$_x$−T$_g$. Nonetheless, the ternary phase diagram of FIG. 2 for drawable tellurite glasses generally applies to any of the glass compositions in which Na may be substituted by Li, K, Rb, Cs, or Ag and in which Zn may be substituted by Be, Mg, Ca, Sr, or Ba. When any of the binary tellurite glasses having a divalent metal was doped with erbium, it showed a fluorescence peak around 1540 nm It is also noted that the tellurite glasses having relatively large values for the non-linear part of the refractive index. Accordingly, fibers and other waveguides made of tellurite glasses can be beneficially used for non-linear optics.

A distinct advantage of the tellurite glasses is their ability to incorporate large amount of optically excitable rare-earth metal ions. However, it was found that a tellurite glass composition having a minimum of 0.05 mole % Na$_2$O was required for the tellurite to readily dissolve erbium. A series of glasses were made following the above procedure in which Er$_2$O$_3$ was added to a host glass of 5Na$_2$O:20ZnO:75TeO$_2$. Compositions containing up to 7 wt % Er$_2$O$_3$ formed glasses. Furthermore, the stability of the glass increased with increasing Er content, as T$_x$−T$_g$ was shown to increase from 95° C. with no Er, to 128° C. with 1 wt % Er$_2$O$_3$, and to 136° C. with 3.9 wt %. However, it thereafter decreased to 119° C. at 7.5 wt %. It is noted that similar increases in T$_x$−T$_g$ occur with an increasing fraction of Na$_2$O from 0 to 5 molar percent. This large incorporation of Er is to be contrasted with silica glasses for which the solubility of Er$_2$O$_3$ is limited to 0.1 wt % for pure silica.

A series of glasses were prepared having all the compositions listed in TABLE 3 and additionally containing about 1 wt % Er$_2$O$_3$. They all showed a glass transition temperature T$_g$ of about 300°–305° C. and their crystallization temperatures T$_x$ ranged from 408 for Li to 432°–449° C. for the other alkali metals. This work has been reported by Wang et al. in "Erbium doped tellurite glasses," *Materials Research Society Symposium Proceedings: Optical Waveguide Materials*, vol. 244, pp. 209–214, 1992.

Figure 3:
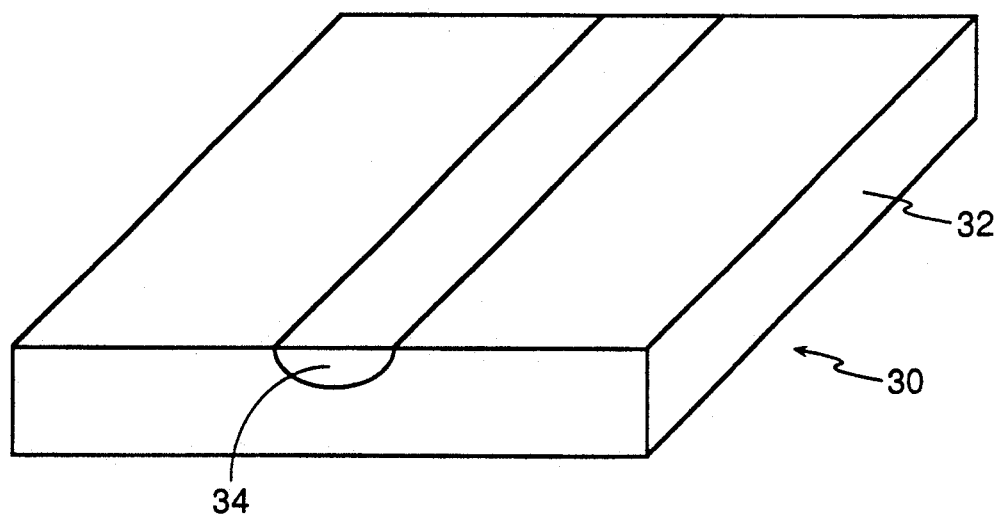
FIG. 3 is a view partially in cross-section and partially in perspective of a diffused surface waveguide.

A planar waveguide 30 may be formed, as illustrated in FIG. 3, in a sheet 32 of tellurite glass by an ion-exchange or similar process in which other ions are diffused in from the surface to form a channel 34. As illustrated, the tellurite sheet 32 only partially surrounds the core channel 34, but air or another deposited material acts as a cladding above the channel 34, although sometimes the channel 34 is buried adjacent to the surface. Ion exchange sources for tellurite glasses which have been studied include KNO$_3$, NaNO$_3$:KNO$_3$, AgNO$_3$:-

NaNO$_3$:KNO$_3$, and AgNO$_3$:DMSO. Almost any ion with valence +1, e.g., alkali metals, silver, or thallium, can be used for exchange in glasses containing an alkali metal. Realistic choices for waveguide fabrication are limited, however, to those which will not increase absorption or create scattering. Initial results show no surface damage dependent on the glass composition. Jackel et al. have disclosed in "Ion-exchanged optical waveguides for all-optical switching," *Applied Optics*, vol. 29, 1990, pp. 3126–3129 how Tl can be ion-exchanged for Na and K in forming a waveguide. Thus, the tellurite glasses described above may have their monovalent metal ion-exchanged with Tl. Monovalent ions other than those mentioned above are considered to produce glasses of poor optical quality, such as excess absorption or scattering at the emissive wavelengths of particular rare-earth ions. Since such a tellurite waveguide 30 can incorporate a large fraction of erbium or other rare-earth metal, a sufficiently long amplifying planar waveguide can be formed in a relatively small planar substrate. However, the ion exchange is expected to occur with the alkali metal or silver and thallium, and the Li alkali metal of Cooley would be unsatisfactory. Its relatively small atomic size will impede its exchange with the larger ions such as K, Ag, and Tl necessary to achieve a desired difference in refractive indices.

Figure 4:
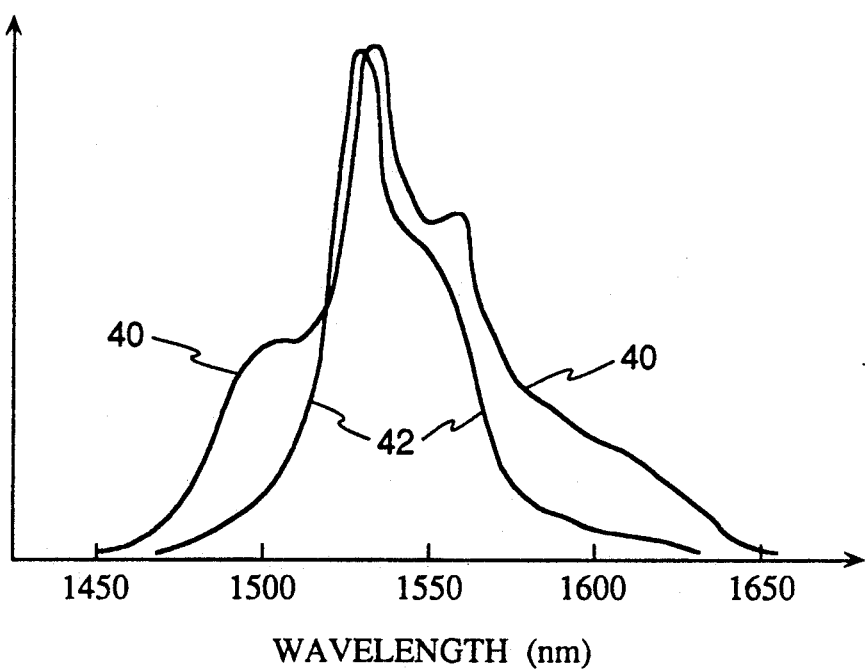
FIG. 4 illustrates fluorescence spectra for both silica and tellurite glasses doped with erbium.

Tellurite fibers doped with erbium offer advantages over silica ones not only because of the high doping levels, which allow much shorter fiber amplifiers, but also because erbium-doped tellurite glasses have a broader fluorescent spectrum which will give a broader useful wavelength interval for an optical amplifier. As illustrated in FIG. 4, fluorescence spectra, which are related to gain spectra, were obtained from both a tellurite glass doped with Er$^{+3}$ and from a similarly doped silica glass. The tellurite spectrum 40 is considerably wider than the silica spectrum 42 for the Er$^{+3}$($^4$I$_{13/2}$–$^4$I$_{15/2}$) transition, which is used for erbium-doped fiber amplifiers.

Figure 5:
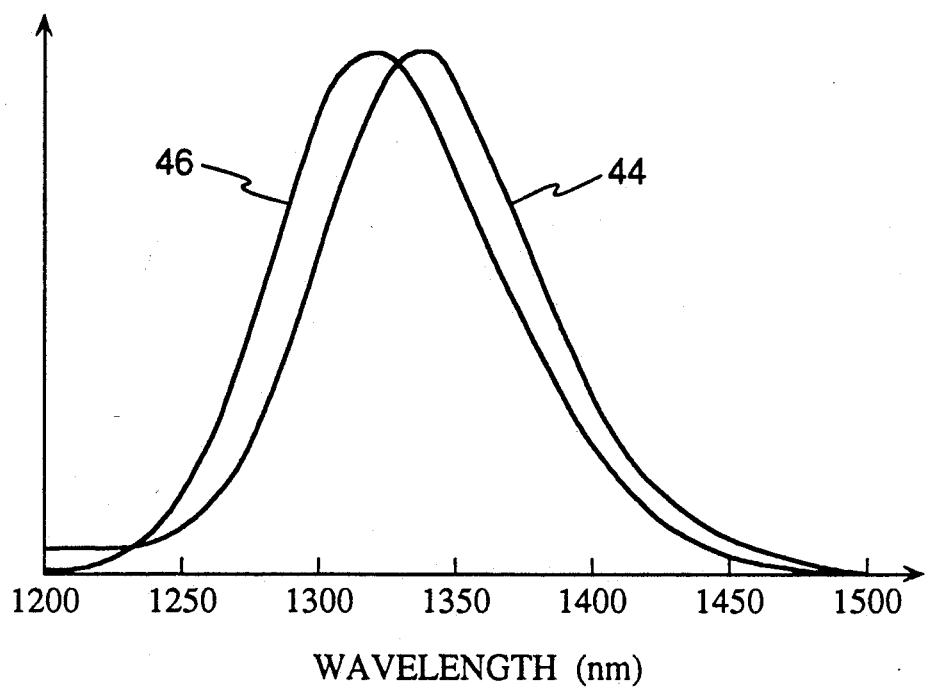
FIG. 5 illustrates fluorescence spectra for both fluoride and tellurite glasses doped with praseodymium.
Figure 6:
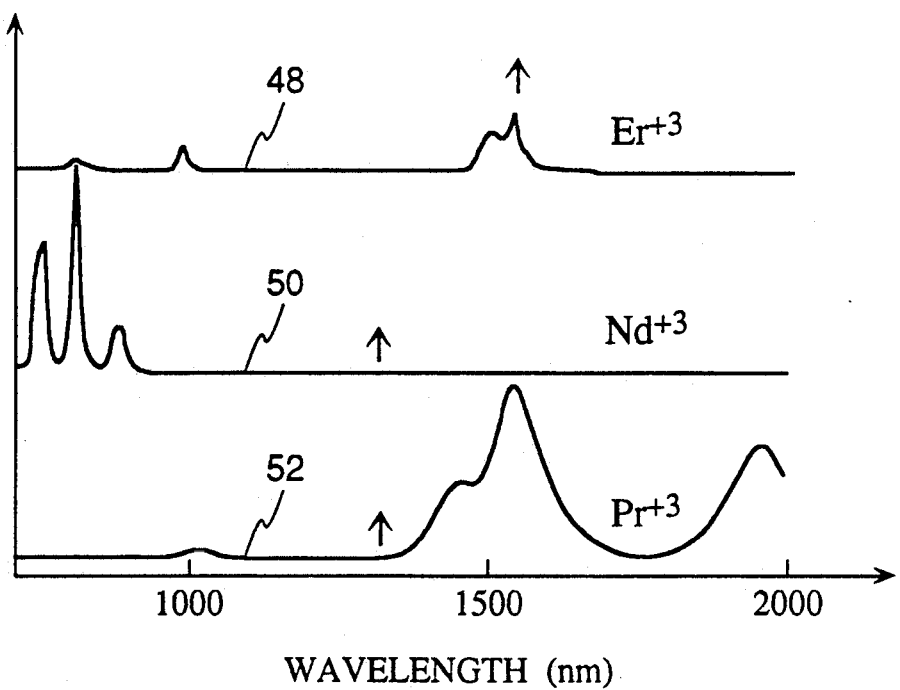
FIG. 6 illustrates absorption spectra for a tellurite glass doped with different rare-earth metals. The baseline is offset between the spectra.
Figure 7:
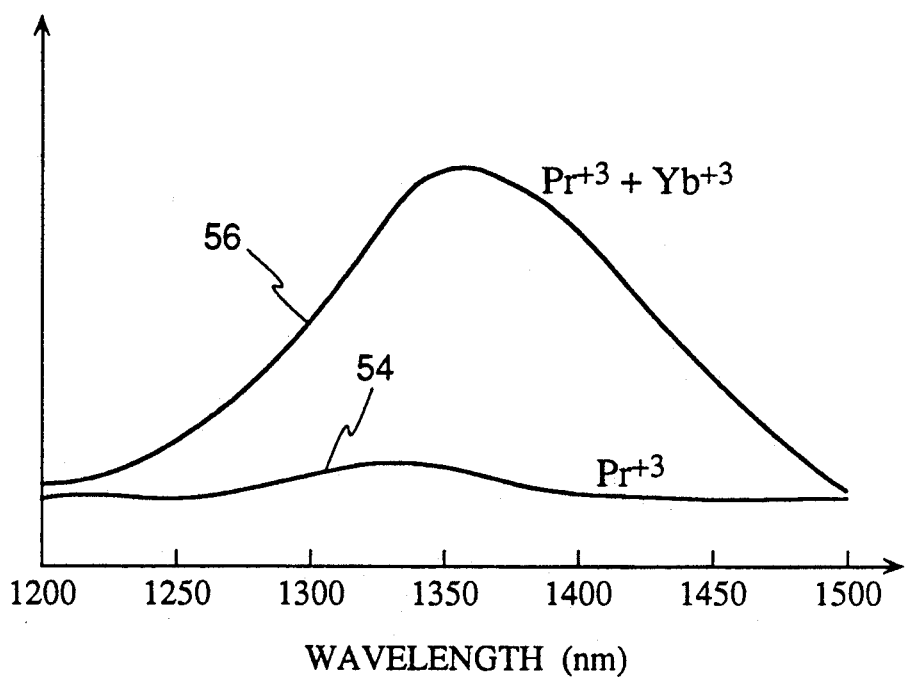
FIG. 7 illustrates fluorescence spectra for a tellurite glass and demonstrates the beneficial effect of Yb co-doping with Pr.

Tellurite fibers can also be doped with praseodymium for amplification in the 1.3 μm band. FIG. 5 illustrates a fluorescence spectrum 44 for a tellurite glass doped with Pr$^{3+}$ and a fluorescence spectrum 46 for a fluoride glass similarly doped. FIG. 6 illustrates absorbance for a tellurite host glass of 5Na$_2$O:20ZnO:75TeO$_2$. Spectrum 48 was measured for the host glass doped with Er$^{+3}$; spectrum 50, doped with Nd$^{+3}$; and spectrum 52, doped with Pr$^{+3}$. The arrows indicate the emission wavelengths for the different doping species. The tellurite glass with praseodymium doping does not have a strong absorption at wavelengths just below the emission wavelength. However, it is known that co-doping with ytterbium (Yb) in fluoride glasses provides the desired absorption. When tellurite glass is doped with Yb, it strongly absorbs near 1000 nm. The above host glass was doped with 1 wt % of Pr$_2$O$_3$. Its fluorescence spectrum 54, illustrated in FIG. 7, was relatively weak. However, when the host glass was doped with 0.1% Pr$_2$O$_3$ and 5.3 wt % Yb$_2$O$_3$ and optical pumped at 0.98 μm, its fluorescence spectrum 56 was considerably increased. The fluorescence peak width was over 100 nm. Here, the Pr$^{+3}$ was excited by non-radiative energy transfer from the Yb$^{+3}$, which was excited by the pump light. Alternatively, the Yb$^{+3}$ could be excited and made to lase at 1.02 μm, which is a wavelength suitable for pumping the Pr$^{+3}$. The latter configuration can be made into a single mode core with two radial sections for the light conductive path. For example, the core could consist of inner and outer regions. The inner core region, doped with Pr, carries the signal to be amplified, and the outer core, doped with Yb, carries the optical pumping power generated at 1.02 μm.

In addition to the alkali-containing tellurite glasses, a series of Nd-doped tellurite glasses were prepared. The host glass compositions ranged in molar concentrations from 11BaO:89TeO$_2$ to 21BaO:79TeO$_2$. Between 1 and 2 wt % of Nd$_2$O$_3$ was added to the host glass. These materials all formed glasses. They exhibited Nd fluorescence peaks around 1.06 and 1.34 μm and an absorption peak near 807 nm. Thus, they seem readily usable for a fiber amplifier in the 1.3 μm silica transmission window.

Other optically excitable rare-earth metals can be incorporated into the tellurite glass. Both thulium (Tm) and holmium (Ho), either separately or in combination, are known for use in fiber amplifiers in the vicinity of 2 μm. The combination of Pr and Yb was described above. In a process relying on upconversion, the fiber amplifier can be pumped at infrared frequencies, but it amplifies at visible frequencies. Two or more infrared photons are absorbed for the emission of a visible photon. That is, the emission frequency is at higher values than the absorption frequency or frequencies. Upconversion is possible in fibers doped with Tm, Ho, Er, and possibly Pr.

We have fabricated a fiber in an experimental program by a simple but non-commercial rod-and-tube process in which the glassy core and cladding are separately cast. A hole of about 1 mm diameter is drilled into the cladding casting, and the interior of the hole is chemically polished. The cylindrical core casting is sized to closely fit within into the tubular cladding. The combination is then drawn into fiber at 390° C. at a drawing rate of 2 m/min. Two fibers were drawn having a core diameter of 10 μm and a cladding diameter of 125 μm. Both fibers had a cladding composition of 8Na$_2$O:20ZnO:72TeO$_2$ and a host core composition of 5Na$_2$O:12ZnO:83TeO$_2$. In one, the core was additionally doped with 0.3 wt % Nd$_2$O$_3$, and, in the other, with 0.05 wt % Er$_2$O$_3$. Doping with 0.03 wt % Pr$_2$O$_3$ is an alternative. These glass compositions are compatible compositions for the fabrication of light conducting optical fibers. The index of refraction of the core was higher than that of the cladding, which was demonstrated by light conduction in the core over a short length of fiber. The core and cladding have compatible thermal properties, which permitted the drawing of the rod-and-tube preform down to a fiber without cracking or crystallite formation.

In a preferred second approach to experimental fiber fabrication, the cylindrical mold for the cladding is not completely filled and is circumferentially spun during the cooling. Thereby, a tubular cladding is centrifugally cast. An example of a material combination formed by this last method has a cladding composition of 8K$_2$O:20ZnO:72TeO$_2$, a host core composition of 5Na$_2$O:12ZnO:83TeO$_2$, and a supplemental core doping of rare-earth ion.

Figure 8:
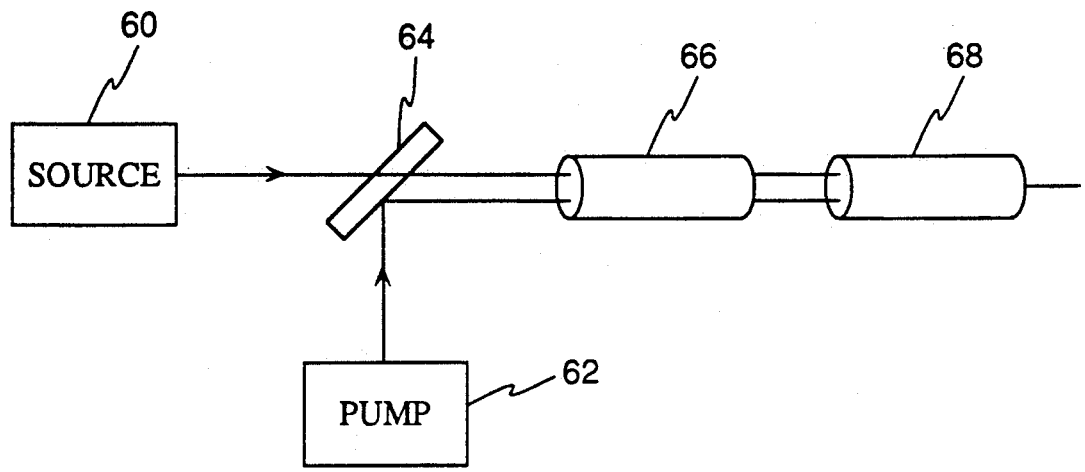
FIG. 8 schematically illustrates an optical amplifier system utilizing a tellurite glass fiber.

FIG. 8 schematically illustrates an optical fiber amplifier in which the doped tellurite optical fiber of the invention can be doped with Er or Pr. A signal source 60 provides an optical signal in the 1.3 μm for Pr or 1.5 μm for Er band requiring amplification. A pump 62 provides an optical pumping signal and is preferably a semiconductor laser diode. For operation in the 1.5 μm band, it may emit at 0.8, 0.98, or 1.48 μm; for the 1.3 μm band, at 1.02 μm. A beam coupler 64, which may be a half-silvered mirror, combines the two beams into a single beam incident upon an optical fiber 66. In operational systems, the fiber 66 is typically a silica fiber which is incorporated into the coupler 64 by fusing together multiple fibers. The fiber 66 is optically coupled to the amplifier fiber 68 doped with Er for 1.5 μm amplification or with Pr and Yb or alternatively with Nd for 1.3 μm amplification. The amplified signal is output from the amplifier fiber 68.

The above description of optical amplifiers applies equally well to optical oscillators. Narrow optical bandwidth is achieved by providing optical feedback to the fiber amplifier by adding, as illustrated schematically in FIG. 9, reflectors 72 and 74 to the ends of the fiber amplifier 68. Light from the pump 62 is focused into the fiber amplifier 68 through a lens 76. The reflectivity of the entrance reflector 72 should be less than 10% at the pump frequency while its reflectivity should be greater than 90% at the lasing frequency. Also, the reflectivity of the exit reflector 74 should be greater than 50%. Typically, the fiber 68 has a numerical aperture of 0.15 and a length of between 5 mm and 30 m. Feedback can be alternatively achieved by configuring the amplifier fiber in a ring. An optical modulator associated with the fiber can electrically modulate the optical carrier.

Figure 9:
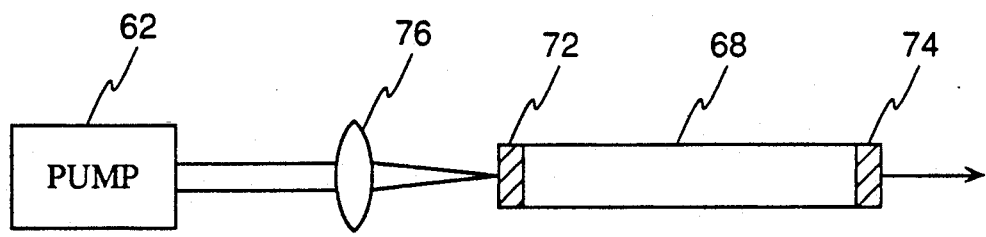
FIG. 9 schematically illustrates an optical oscillator system utilizing a tellurite glass fiber.

The structure of FIG. 9 can be made into a superluminescent light source by removing the reflectors 72 and 74 or just the exit reflector 74. Such a light source amplifies the spontaneous emission noise within the gain bandwidth of the amplifying tellurite glass fiber 68 and provides an intense, wide-band light source.

Thus, the invention provides a class of tellurite glasses which can be easily drawn and which have superior optical drawing properties for use in optical fibers, especially fiber amplifiers. They allow for amplification in the 1.3 μm band without the physical limitations of fluoride fibers. Even in the 1.5 μm band, they offer some advantages over silica fibers. The large number of components available in such tellurite glasses allow the fabrication of complex optical articles.

What is claimed is:

1. A tellurite glass material suitable for making an optical fiber amplifier, said material comprising an excitable rare-earth ion in a host composition consisting essentially of $TeO_2$, $R_2O$, and QO in molar proportions included within line EFGE of FIG. 2 and wherein the molar proportion of $R_2O$ is at least 0.05 mole %, where R is a monovalent metal selected from the group consisting of Na, K, Rb, Cs, Tl, and Ag, and Q is a divalent metal selected from the group consisting of Zn, Be, Mg, Ca, Sr, and Ba.

2. A tellurite glass material as recited in claim 1, wherein QO comprises ZnO.

3. A tellurite glass material as recited in claim 2, wherein $R_2O$ comprises $Na_2O$.

4. A tellurite glass material as recited in claim 1, wherein $R_2O$ comprises $Na_2O$.

5. An optical waveguide comprising:
a) a first tellurite glass composition core having a first refractive index, and
b) at least partially surrounding said core, a second tellurite glass composition cladding having a second refractive index less than said first refractive index,
at least said first composition hosting at least one species of excitable rare-earth ion, and each of said first and second compositions consisting essentially of $TeO_2$, $R_2O$, and QO in molar proportions included within line EFGE of FIG. 2, wherein the molar proportion of $R_2O$ is at least 0.05 mole %, where R is a monovalent metal selected from the group consisting of Na, K, Rb, Cs, Tl, and Ag, and Q is a divalent metal selected from the group consisting of Zn, Be, Mg, Ca, Sr, and Ba.

6. An optical waveguide as recited in claim 5, wherein R for said first composition differs from R for said second composition.

7. An optical waveguide as recited in claim 5, wherein said first and second compositions comprise the same R, but in different molar proportions.

8. An optical waveguide as recited in claim 5, wherein said core is a fiber and said cladding surrounds said core.

9. An optical waveguide as recited in claim 5, wherein said cladding is formed as a planar body and said core is formed as a surface channel in said planar body.

10. An optical waveguide as recited in claim 8, wherein the at least one hosted excitable rare-earth ion species is selected from the group consisting of Er, Yb, Nd, Pr, Tm, and Ho.

11. An optical waveguide as recited in claim 10, wherein the hosted rare-earth ion species is Er.

12. An optical waveguide as recited in claim 11, wherein a hosted rare-earth ion species is additionally Yb.

13. An optical waveguide as recited in claim 10, wherein the hosted rare-earth ion species is Nd.

14. An optical waveguide as recited in claim 10, wherein the hosted rare-earth ion species is Pr.

15. An optical waveguide as recited in claim 10, wherein the hosted rare-earth ion species is Tm.

16. An optical waveguide as recited in claim 10, wherein the hosted rare-earth ion species is Ho.

17. An optical amplifier comprising:
a) an optical waveguide as recited in claim 10;
b) a first source of light having one or more pumping frequencies for exciting said at least on rare-earth ion;
c) means for coupling light from said first source into the core of said waveguide;
d) a second source of light to be amplified; and
e) means for coupling light from said second source into said waveguide.

18. An optical oscillator comprising:
a) an optical waveguide as recited in claim 10;
b) a source of light having one or more pumping frequencies for exciting said at least on rare-earth ion; and
c) means for coupling light from said first source into the core of said waveguide.

19. An optical oscillator as recited in claim 18, further comprising feedback means for causing said core to lase.

* * * * *